United States Patent [19]

Cox

[11] Patent Number: 4,842,749
[45] Date of Patent: Jun. 27, 1989

[54] INVERSION TUBE PRESS

[76] Inventor: Clyde H. Cox, 3309 Blue Bell La., Birmingham, Ala. 35243

[21] Appl. No.: 251,557

[22] Filed: Sep. 30, 1988

[51] Int. Cl.$^4$ ............................................. B01D 33/00
[52] U.S. Cl. .................................... 210/783; 210/386; 210/400; 198/819; 100/118; 100/120
[58] Field of Search ............... 210/783, 400, 401, 359, 210/386, 387; 100/118, 119, 120, 122, 151, 153; 198/819

[56] References Cited

U.S. PATENT DOCUMENTS

| | | | |
|---|---|---|---|
| 3,914,080 | 10/1975 | Kamp | 198/819 |
| 4,039,450 | 8/1977 | Brown | 210/400 |
| 4,174,033 | 11/1979 | Parsons | 198/819 |
| 4,373,625 | 2/1983 | Parsons | 198/819 |
| 4,601,389 | 7/1986 | Minovitch | 198/819 |
| 4,748,907 | 6/1988 | Schermutzki | 100/153 |

Primary Examiner—Richard V. Fisher
Assistant Examiner—Matthew O. Savage
Attorney, Agent, or Firm—Jennings, Carter, Thompson & Veal

[57] ABSTRACT

A filter press utilizes a continuous loop tube having at least one longitudinal segment made of filter media and an insert frame encapsulated within the tube. The tube is driven by a roller chain/link chain combination such that the tube is repeatedly inverted and drawn through the frame. A liquid/solid slurry is introduced at one end of the tube and passes through the frame therewith wherein hydrostatic and hydraulic forces urge the liquid outwardly through the filter media which retain the solids until they have passed through the restricted volume of the frame. No lateral seals are required in as much as the tube completely encircles the slurry.

26 Claims, 11 Drawing Sheets

INVERSION TUBE PRESS

FIELD OF THE INVENTION

The present invention relates to a method and apparatus for separation of the liquid content from slurries, sludges and other liquid-solids suspensions with retained solids being compressed into a dry, manageable thickened mass or cake form. The invention can be applied in both the industrial process and also in the water and wastewater treatment field.

More particularly, the present invention relates to an improved method and apparatus for slurry thickening, solids separation and dewatering comprising a press utilizing a unique filter media arrangement, movement and configuration.

BACKGROUND OF THE INVENTION

Filters or presses are important in industry, particularly in the manufacturing industry and the chemical industry in such processes as removing dirt impurities and other foreign matter from oils and liquids in grinding, cutting and forming operations or from cooling and treating waters. Filters or presses are also important in water and wastewater treatment plants to reduce the vast quantities of sludge currently produced.

Filters have been used for centuries to capture or separate solids from liquid streams, wherein either the separated liquid or solid is the desired product. Separation of the solid from the liquid or just the reduction of the liquid fraction from the slurry will result in the reduction of the large quantity of material to be transported to a landfill or to incinerate. The filter may be simply a porous screen which the slurry is subjected to or the apparatus may be a mechanical device which is complicated and expensive to purchase and operate.

Of all the mechanical dewatering or liquid-solid separation devices known today, the belt filter press is probably the most efficient and the bag filter is the simplest. The belt press, however, has not been without its limitations. One such problem has been the sealing of the belts to form a fixed volume. A problem in any type of moving belt filter has been the tendency of the liquid being filtered or dewatered to pass around the edges of the filter belt element. Conventional belt presses are open along their lateral edges and utilize the tendency of the slurry to thicken along these edges to form a self-sealing boundary therealong, as well as along the bottom of the column of the sludge in an upstanding belt press. However, these self-sealing boundaries are insufficient to maintain the slurry within the confines of the belts when subjected to moderately high hydrostatic head pressure or mechanical pressure. Consequently, the self-sealing features of the belt presses are a limitation on the amount of pressure which may be applied to the slurry entrained therein. Improved constructions which seals the edges have been developed but these seals are mechanical and subject to wear, failure, and are costly to provide and maintain. Known sealing devices include elastomeric members, magnetic sealing closure, conventional zippers and pressure closures. Patents in the U.S. covering such improvements are as follows: U.S. Pat. Nos. 3,630,381; 4,425,842; 3,965,011; 3,464,557; 4,475,453; 4,276,822; 4,040,952; and 4,514,301. Foreign patent documents which are noted improvements are as follows: Great Britain Pat. No. 2,031,293 and West Germany Pat. Nos. 2,751,849 and 3,404,422.

Furthermore conventional belt presses display a tendency to have their belts walk or travel in an unwanted direction as they move over their associated rollers, thereby making it difficult to maintain proper alignment of the belts without the use of pneumatic/hydraulic operated aligning mechanisms. Such alignment mechanisms are available, however, they are expensive to supply and operate and subject to failure. Prior art for belt alignment also includes roller chain alignment mechanisms attached to the media edges to help in belt alignment but this method is also complicated, costly and subject to failure.

One of the oldest filters used in industry and is still utilized today is the bag filter. In 1824, William Cleland, an Englishman, took out patents for the clarification of sugar juices through bags. Such bags were closed at one end by fastening with string while the other end was tied to an inlet nipple where the liquid to be filtered finds its way by gravity. Clarified filtrate was collected outside the bag as the bag retains the solids. When such bags are used today and a bag becomes clogged, it is removed, disconnected, emptied, cleaned and replaced, necessitating a very considerable amount of time and labor. Bag filters are therefore expensive to operate even though they give a clean filtrate. Consequently, one will find bag filters in only older industrial plants today.

Batch filter bags have been recently utilized in wastewater treatment plants in the thickening/dewatering of sewage sludges. These bags are utilized either singularly or arranged alternately one behind the other. However emptying of such devices is time-consuming and labor intensive. Yet another problem is that the hydraulic head acting on the sludge-slurry in the bag is not uniform, i.e., the maximum head is on the sludge in the bottom of the bag while the sludge in the upper portions of the filter bag will have far less hydrostatic head pressure therefore cake or filtered solid product emptied from such bags is inconsistent in thickened mass or cake dryness. It has been found that the use of such filter bags does not lead to a sufficient degree of removal of water or liquid, i.e., maximum dryness and minimum bulk, even if the full sludge bag hangs for several days prior to emptying due to the lack of maximum hydrostatic head acting on the entire depth of sludge. In some cases, the hydrostatic head pressure even in the bottom of the batch filter bag is insufficient for dewatering.

From the foregoing it is desirable to find an apparatus that would eliminate the limitations of the moving belt filter such as belt sealing and complex construction. Likewise it would be desirable to make the batch filter bag automatic for continuous sludge/slurry input and dewatered product withdrawal or ejection thus saving labor costs and initial cost associated with multiple units. Also it is desirable to have all of the sludge/slurry in the filter bag subjected to the same hydrostatic head as the sludge/slurry positioned at the bottom of the batch filter bag. That is to say, all of the sludge/slurry should be subjected to the maximum hydrostatic head available so that the dewatered or thickened product withdrawn or ejected is consistent in nature. Also it would be desirable to exert more pressure on the sludge in a bag filter over and beyond that of the hydrostatic head such as mechanical pressure or shear stresses upon the sludge in the bag filter if possible.

In the West German Pat. No. 2,751,849, means were provided to take advantage of the hydrostatic head generated by a vertical standing filter using similar principles to the batch filter bag but continuous with means to subject the slurry/sludge to the maximum hydrostatic head as the sludge moves down or through the device. The device disclosed therein is automatic or continuous with two parallel endless filter belts which run in the vertical plane facing each other between two perforated plates. The belts pass through compression rolls and are mechanically sealed at their sides or edges by rubber supports on chain belts to prevent lateral leakage as the belts advance. These chain belts also serve to move the filter medium and the compression rolls but, the disadvantage of the seals used in any type of moving belt filter, such as cited above, persist in the West German patent in that these seals are still mechanical and are subject to failure. The seals must be engaged to seal the sides of the belts at the start of the filter cycle as the belts advance and must be disengaged at the discharge end of the filter or completion of the filtration cycle to permit slurry introduction and cake discharge and filter media return to the top of the filter to begin a new cycle. As with any mechanical seal, these seals are subject to wear and failure. Furthermore, the mechanism of U.S. Pat. No. 2,751,849 is also very complicated and expensive to purchase and operate.

Thus the known prior art remains limited in its efficiency and economy of application.

SUMMARY OF THE INVENTION

An object of the present invention is to provide an inexpensive, simple thickening dewatering filter press apparatus and method which combines the best features of most moving belt filters and the simple bag filter, while avoiding the limitations of each. An aspect of this object is to provide a method and apparatus which permits high hydrostatic head upon the sludge, permits a high hydraulic loading, permits processing of a more dilute slurry, permits simplification of belt media cleaning, eliminates belt media sealing failures, eliminates belt media alignment problems, permits continuous application of inlet sludge - slurry and continuous discharge or ejection of dewatered/thickened solids product while making the discharge product uniform in nature while assuring maximum dryness and minimum bulk.

Another object of the invention is to provide an apparatus with an improved filter media configuration or arrangement and supporting - hanging structure which allows higher hydraulic loading, increase pressure on the slurry, and permit application of a dilute slurry to the apparatus without the danger of creep or extrusion from between the belts as with conventional moving belt filters even with side belt seals.

Another object of the invention is to provide a continuous or automatic thickening dewatering filtering apparatus which not only is automatic or can be operated continuously with liquid slurry fed continuously and dewatered product being ejected continuously if desired but allows all the sludge to be subjected to the maximum hydrostatic compression prior to discharge as compared to sludge discharged from a batch operated filter bag or a vertical standing filter without the use of mechanical belt seals.

Another object of the invention is to provide an automatic or continuously operated thickening, dewatering or filtering apparatus which not only allows all the sludge in the tube to be subjected to the maximum hydrostatic head available in the tube press but also subjects the slurry to mechanical pressure - shear stresses prior to discharge as compared to sludge discharged from a conventional batch operated filter bag.

Another object of the invention is to provide a chamber or tube with closure formed by the filter media configuration and apparatus for the introduction of marginally conditioned or non-conditioned sludge or thinner, more dilute slurry thereby making the filter or press more amenable to a wider utilization in the field.

Yet another object of the invention is to provide an apparatus incorporating an improved method of drive and alignment of the filter media configuration which will keep the filter media aligned in the apparatus.

Another object of my invention is to provide a filter having a filtering media that is cleaned with minimal use of pumps, nozzles, or other external means using the internal filtrate collected prior to its exit through the apparatus.

Another object of the invention is to provide a continuous thickening-dewatering apparatus with a filter media configuration and supporting hanging structure utilizing a vacuum pump which assists self cleaning of the media.

Another object is to provide a non-interrupted continuous internal surface forming a volume or tube without a mechanical seal of the two endless filter belts which are engaged and disengaged during the filtering dewatering thickening cycle.

Another object is to provide a filter apparatus which can run as a fill and draw batch operated apparatus which can be manually operated to automatically advance the filter media tube thus emptying the apparatus, clean the filter media and advance the clean media back into position for filling the unit with inlet slurry for a cycle beginning.

Another object of my invention is to provide an improved liquid filter for removing dirt, impurities and other foreign matter from oils and liquids used in the manufacturing and chemical industry or separation of solids from the mother liquid in some industrial or commercial processes.

These and other objects of the present invention are achieved by a method and apparatus for expressing the liquid phase from a wet mixture comprising an inverted filtering dewatering tube assembly, hanging structure and driving means.

The inversion tube press comprises a continuous composite material inversion tube filter dewatering thickening press assembly, a hanging structure, and a driving-inverting and supporting means. The composite material inversion tube is made up of one or two long semi-rigid filter media belts and one or two long flexible non-porous inversion strips of material alternately joined together permanently to form a long continuous non-interrupted single wall laterally sealed tube open at both ends. A pair of link chains are attached to the non-porous inversion strips. The formed elongated composite material tube is inserted into a rigid insert structure with rollers or other rigid porous structure therein. The insert is generally rectangular in cross section, has an overall length slightly less than one-half the overall length of the total length of the composite material tube and is smaller in cross sectional area than that of the composite material tube. The ends of the tube are inverted over itself and over the rigid insert structure thereby completely enveloping the same. The inverted ends of the composite material tube are then aligned with filter media belt to filter media belt and inversion material strips to inversion material strips and sealed together to form a two walled inverted tube having an opening at both ends. The chains which are attached to the flexible inversion strips is also connected to form a pair of continuous members carried internally of the tube within the insert structure and externally of the tube outside the insert structure and available for engagement with a means for urging the inversion tube in a repetitive inversion cycle. The thus formed two walled composite material inversion tube has both an inside and an outside surface or wall of primarily filter belt media with the insert frame structure contained within the resulting cavity formed by the inverted tube. The sealed inversion tube can continuously move in, through, out and over the rigid insert structure by continuous inversion at the urging of a hanging, driving and supporting means. Dewatering, thickening, filtration or pressing takes place due to mechanical pressure, shear stresses and by hydrostatic head acting upon the slurry introduced into the inlet opening of the vertically hung, or partially vertically hung, inversion tube. Thus slurry processed within the confines of the inside surfaces of the insert structure results in thickened or dewatered cake or dry solids product which is ejected from the inversion tube press at the discharge opening of the inversion tube. The filtrate or liquid portion of the slurry removed from the solids of the slurry exits through both the inside and outside walls or surfaces of the filter belt or belts of the composite material tube and is collected below the inversion tube press. The rigid porous insert structure rides freely in the cavity inside the two walled inverted tube and forms a fixed volume restriction which curtails expansion of the inside walls or surfaces of the composite tube contained therewithin. This allows or aids in easy advancement or conveyance of the inversion tube without the inside surfaces of the tube expanding outward into the outside surfaces of the tube by hydrostatic pressure, which would restrict the free movement of the surfaces or walls of the filter tube making continuous inversion difficult.

As the outside surface or wall of the inversion tube advances, a corresponding portion of the inversion tube's composite material is pulled into the inside of the rigid insert structure at one end with a corresponding amount of inversion tube material pulled out of the rigid insert structure at the other opening and subsequently pulled along the outside of the insert structure for filter media belt cleaning and return of that portion of the inversion tube to the inlet opening for a cycle beginning. As the clean filter media belts of the inversion tube are pulled inside the roller frame insert at the inlet opening thus forming the filtering portion of the inside surface of the inversion tube press, slurry is introduced to the inlet inversion tube press opening and subsequently as the inversion tube composite material is pulled out and up or over the outside of the roller frame insert, dewatered or thickened solids product is ejected from the inversion tube press discharge opening. Liquid or filtrate goes through the filter media belts portion of the inversion tube and is collected outside the inversion tube press while the solids are retained upon the inside surfaces of said filter media belts or upon previously deposited solids thereon and will be discharged/ejected as the inversion tube advances or is driven to the inversion tube press's discharge outlet.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENTS

Figure 1:
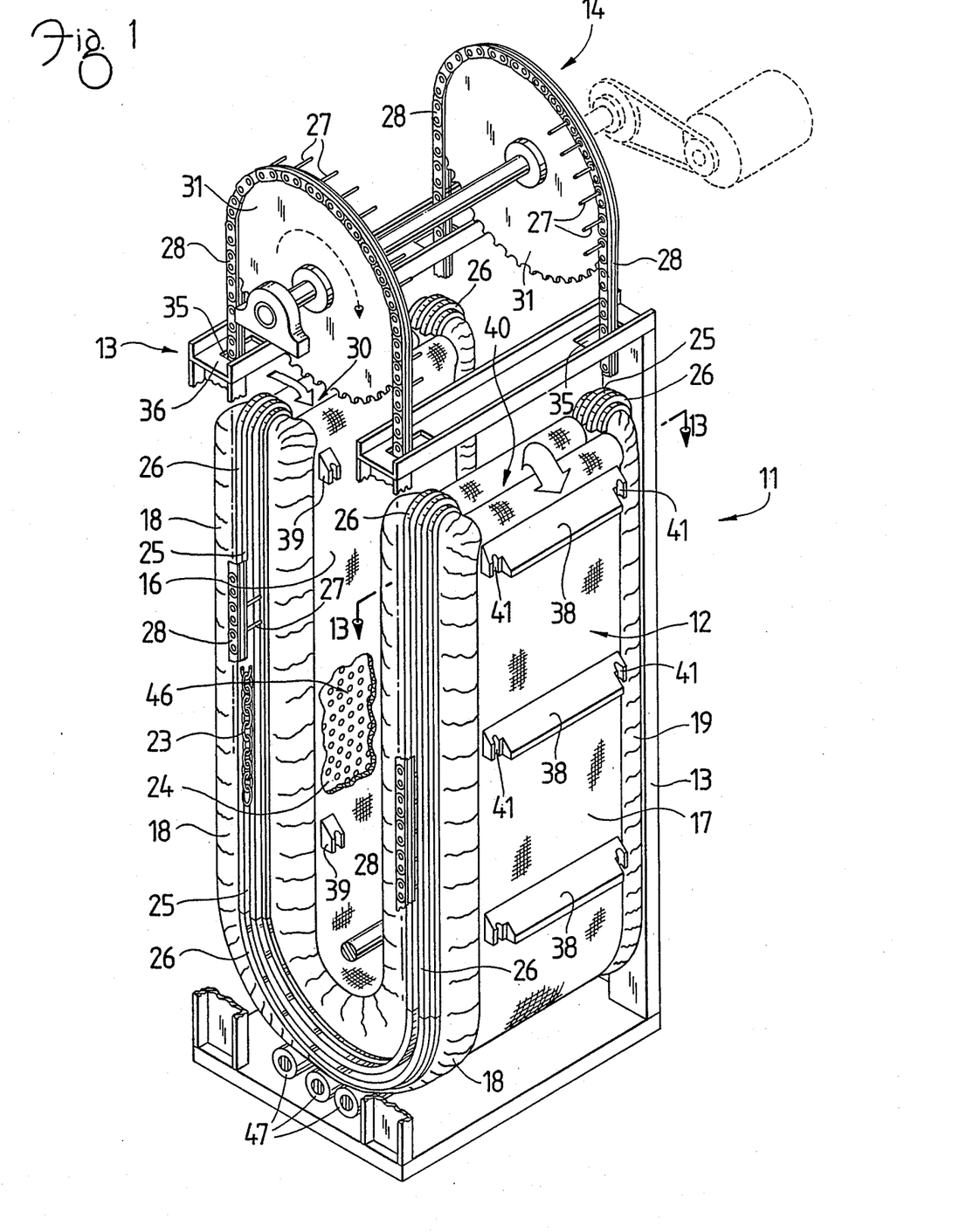
FIG. 1 is a perspective view of the preferred U-shaped embodiment partially in section and partially broken away for clarity.
Figure 7:
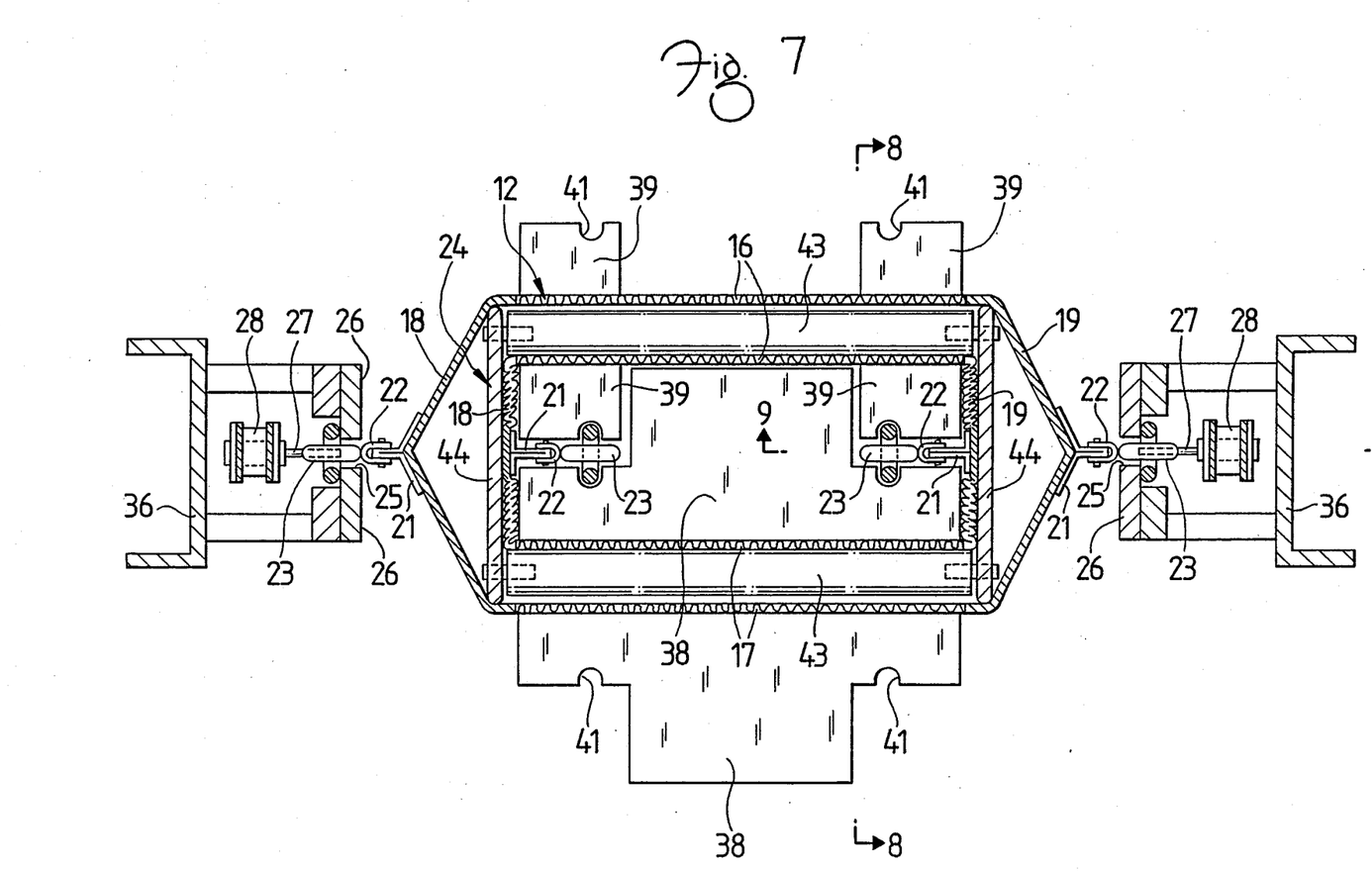
FIG. 7 is a partial sectional view taken along line 7—7 of FIG. 2.
Figure 8:
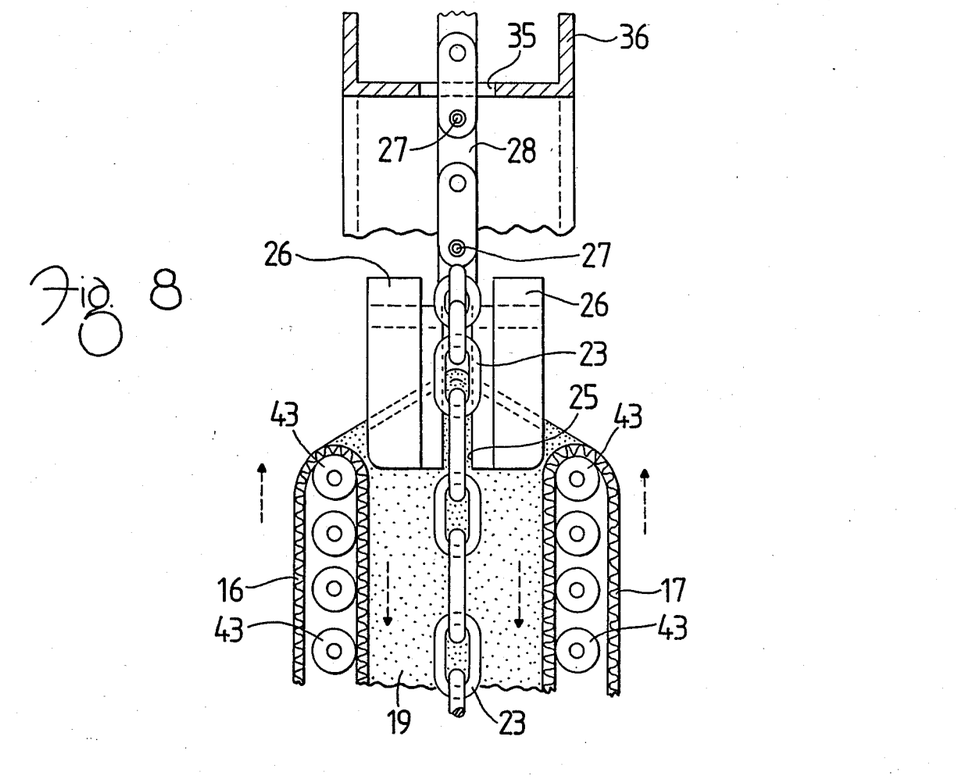
FIG. 8 is a partial sectional view taken along line 8—8 of FIG. 7.
Figure 9:
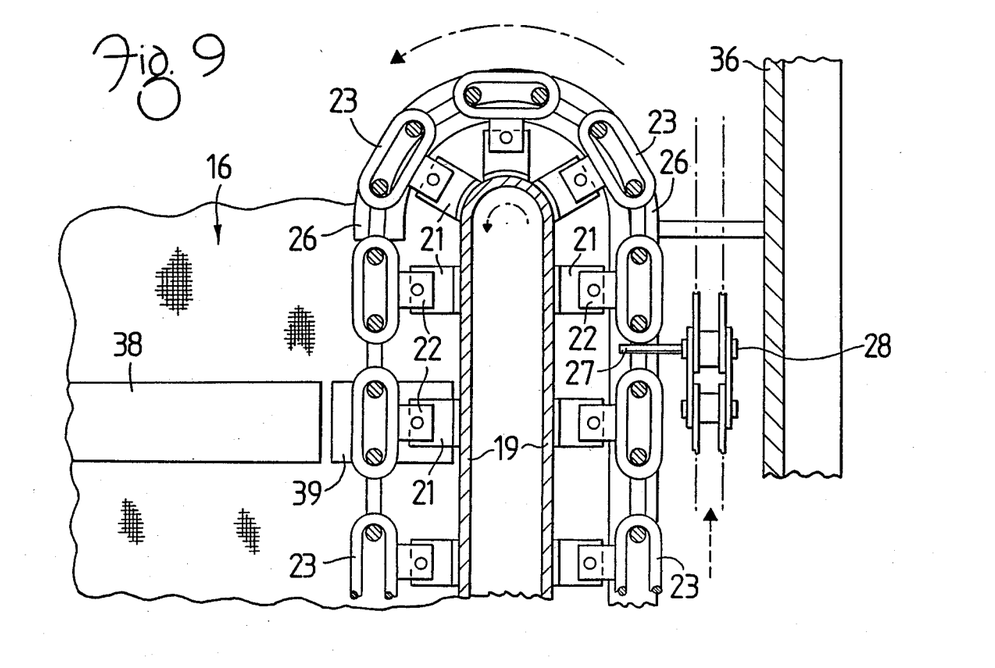
FIG. 9 is a partial sectional view taken along line 9—9 of FIG. 7.

Referring to the drawings for a clearer understanding of my invention, a filter thickening dewatering inversion tube press, hereinafter tube press 11 is shown in various embodiments. In FIG. 1, which shows the preferred embodiment with certain components such as alignment sprockets omitted for clarity, it may be seen that the tube press 11 includes a continuous composite material inversion tube 12; a hanging and supporting structure 13, and a driving means 14. The tube 12 is made from two elongated semi-rigid filter media belts 16 and 17 and two elongated flexible non-porous inversion strips 18 and 19 which are joined permanently to form a long single walled tube 12 which is open at both ends. The walls of the tube 12 thus are alternately filter material and inversion material. It may be noteworthy to mention that the presently described embodiment utilizes semi-rigid filter media which resists simultaneous deformation in more than one dimension, however in some embodiments, flexible filter media may be used and the entire tube 12 may be made from filter media. The inversion strips 18 and 19 have attached thereto a plurality of cloth belt tabs 21 as shown in FIGS. 7 and 9. These tabs 21 are about an inch wide and are attached along a longitudinal line bisecting strips 18 and 19. Each tab 21 is secured in a U-shaped metal clip 22, each of which is permanently attached to a link of an elongated link chain 23 such as by welding such that every other link of the chain 23 is attached to the tube 12. The inversion tube 12 with the pair of link chains 23 attached is inverted so that the chains 23 are inside the tube 12.

The tube 12 with the two chains 23 attached to the inside surface of the inversion tube 12 is then passed through a rigid insert structure 24. The insert structure 24 may be U-shaped, linear, L-shaped, offset or of such configuration as may be required, depending on the embodiment selected. The tube 12 is of a length slightly greater than twice the length of the insert structure 24 such that the free ends of the tube 12 extend beyond the insert structure 24 and can be inverted to encapsulate the insert structure 24. With the insert structure 24 thus completely enclosed, the ends of the tube 12 are permanently attached so that an endless tube conveyor is formed and the ends of the two link chains are attached to form two continuous non-interrupted link chains for hanging, supporting and driving the inversion tube. Note that the link chain 23 is carried internally of the tube 12 within the insert structure 24 and externally of the tube 12 outside the insert structure 24. The rigid porous insert structure rides freely in the cavity inside the two walled inverted tube and forms a fixed volume restriction which curtails expansion of the inside walls or surfaces of the composite tube contained therewithin. This allows or aids in easy advancement or conveyance of the inversion tube without the inside surfaces of the tube expanding outward into the outside surfaces of the tube by hydrostatic pressure, which would restrict the free movement of the surfaces or walls of the filter tube making continuous inversion difficult.

Referring to the FIGS., it will be noted that a pair of J-rails 26 are disposed on either side of the tube 12 and are part of the hanging and supporting structure 13. Note also that the links of chain 23 which are not attached to the tube 12 are aligned generally perpendicular to the tabs 21. The J-rails 26 are spaced apart as at 25 such that the links of chain 23 attached to tabs 21 which in turn are attached to the inversion tube 12 are able to align with and pass through space 25 between the J-rails. This allows the non-attached link to ride against the side of the J-rail opposite the tabs 21 for alignment, hanging and support. The non-attached link is thus properly aligned for engagement by one of a plurality of evenly spaced pins 27 carried on a driven roller chain 28 which may be of a commercially available type roller chain having one extended pin on a pin link; and which passes over a plurality of drive sprockets 31 and alignment sprockets 32–34. The roller chain 28 passes through an opening 35 in a frame 36 of the hanging and supporting structure 13, which supports the J-rails 26, with the pins 27 aligned with the space 25 between the J-rails 26. It may be seen that the tube 12 and insert 24 are thus entirely supported by the J-rails 26 through the link chains 23 attached to the inversion tube. This also provides direct support of the tube 12 and insert 24 with contained sludge by the link chains 23 as shown in FIG. 7. The roller chain 28 is advanced by supplying manual or mechanical drive power to drive sprockets 31 mounted on appropriate shafts on axles as shown.

Referring to FIGS. 1, 2, 2a, 3, 4, 5, 7 and 9 a number of flights 38 of a semi-flexible material may be attached to filter media belt 16. These flights 38 cooperatively mate with sealing members 39 carried by belt 17 and have cooperatively formed recesses 41 at each end to receive link chain 23 therein.

In the embodiments other than the U-shaped embodiment these flights 38 and sealing members 39 cooperate with a diminished interior cross-section to provide temporary closure of the lower extremity of the inversion tube 12 within insert structure sufficient to retain the slurry within the tube 12 for a sufficient time to permit dewatering due to hydrostatic head generation. Closure of the discharge outlet 40 for hydrostatic head generation for the preferred U-shape of FIG. 1 is not necessary in as much as the slurry inlet 30 and outlet 40 are at or near the same elevation. The rigid insert structure offers constriction or resistance to expansion of the filter tube and the closely spaced rollers 43 if utilized for construction of the rigid insert structure 24 aid in conveyance and inversion of the inversion tube 12 as the tube 12 moves down through and out the insert structure 24. The narrow space formed by the parallel walls of the insert structure 24 is approximately the desired thickness of the dewatered cake or thickened mass to be discharged from the outlet 40. This thickness may be several inches or it may be something less than an inch, however this dimension could be quite variable depending on the characteristics of the slurry and the desired results. The cross-sectional area of the insert structure 24 may be constant as in the U-shaped embodiment, but on all other configurations preferred embodiment the insert structure cross-sectional area decreases to form a wedge shaped chamber and then a smaller constant cross-sectional area volume. In the wedge shaped portion of the insert structure 24 the distance between the opposing sides of the insert structure 24 and thus the distance between the opposing walls of tube 12 decrease producing an increase in pressure as the tube 12 with slurry contained therein is pulled or advanced. The inside surface of the inversion tube 12 in conjunction with the rigid insert structure 24 forms a fixed non-expandable, unless designed for, volume to create the necessary expansion restriction with the tube and thus hydrostatic pressure on the sludge/slurry contained within the inside confines of the vertically hung or partially so inversion tube 12 to achieve thickening, dewatering, and filtration and to prohibit the expansion of the inside tube wall into the outside tube wall. Obviously such expansion would stop or greatly impede the free movement of tube 12 over itself continuously renewing itself.

Dewatering, thickening, filtering or pressing take place due to mechanical pressure, shear stresses and by hydrostatic head acting on the slurry confined in the press. Slurry is introduced at the inlet opening 30 of the vertically oriented inversion tube wherein liquid or filtrate passes through the filter media belts 16, 17 and thickened or dewatered cake is carried through the tube and ejected at the discharge opening 40 of the inversion tube 12. The filtrate removed through the filter media belts is collected below the press. Note that the filtrate must pass through the inner wall of the inversion tube 12 and the outer wall of the inversion tube 12, both of which are the same continuous or non-ending filter media belt 16 or 17 once it is assembled and placed into operation. As the filtrate passes through the outer wall of filter media belts 16 or 17 it aids in dislodging solid particles by movement in the reverse relative direction to that which the solid particle moved to become lodged in the filter media belt 16 or 17, thus the filtrate assists in providing a self-cleaning process. Of course, a vacuum pump 42 positioned below or to one side of, yet adjacent, the outside wall or walls of the tube 12 can be used to assist in drawing the filtrate through the outer wall of filter media belts 16 or 17. Also high pressure spray nozzles (not shown) may be employed to assist with filter media belts 16 or 17 cleaning if desired.

Figure 2:
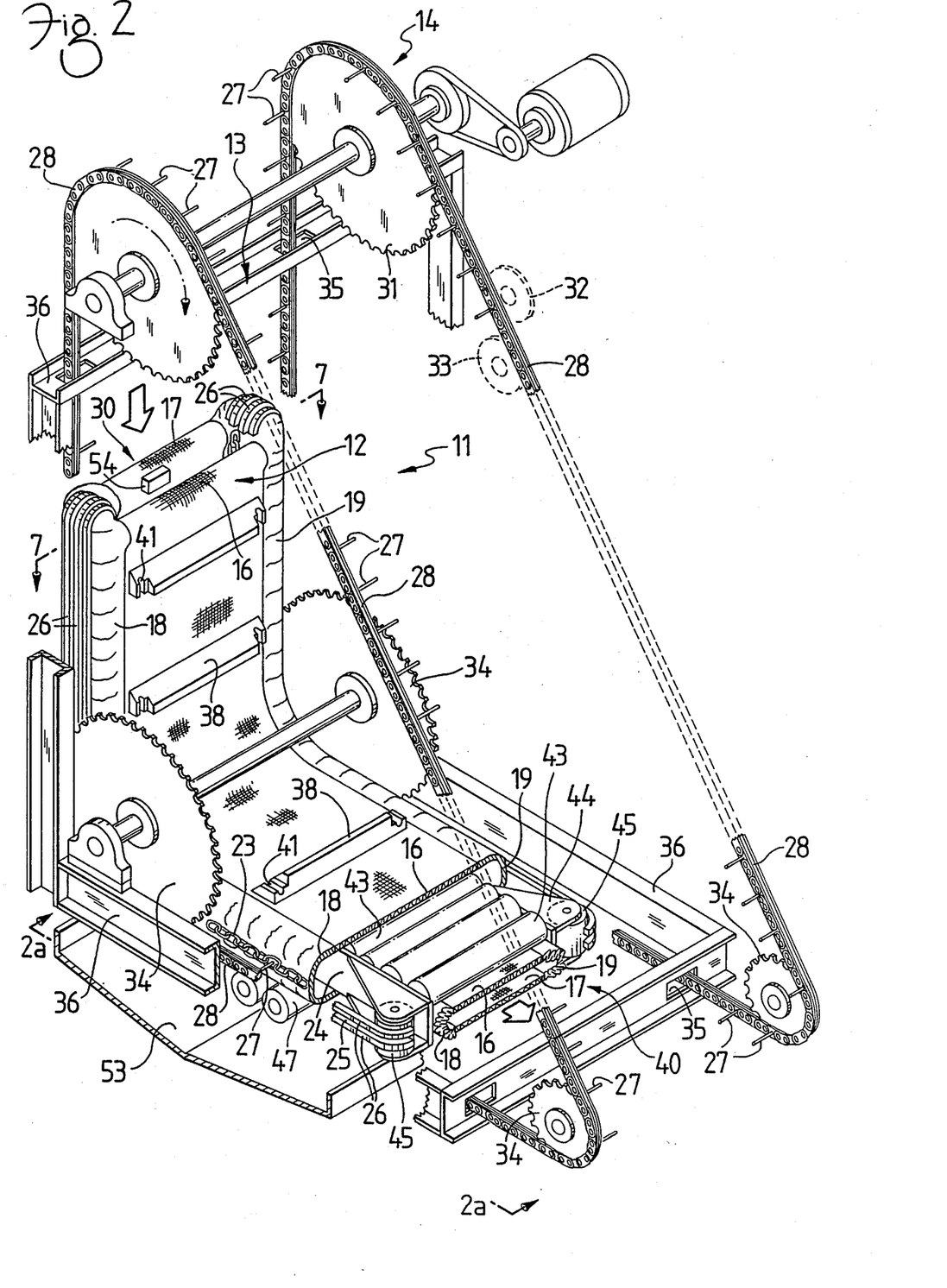
FIG. 2 is a perspective view partially broken away and partially in section showing an L-shaped thickening dewatering filtering apparatus utilizing a regenerating non-interrupted volume configuration of two filter media belts joined at their edges by an intervening flexible material.
Figure 2A:
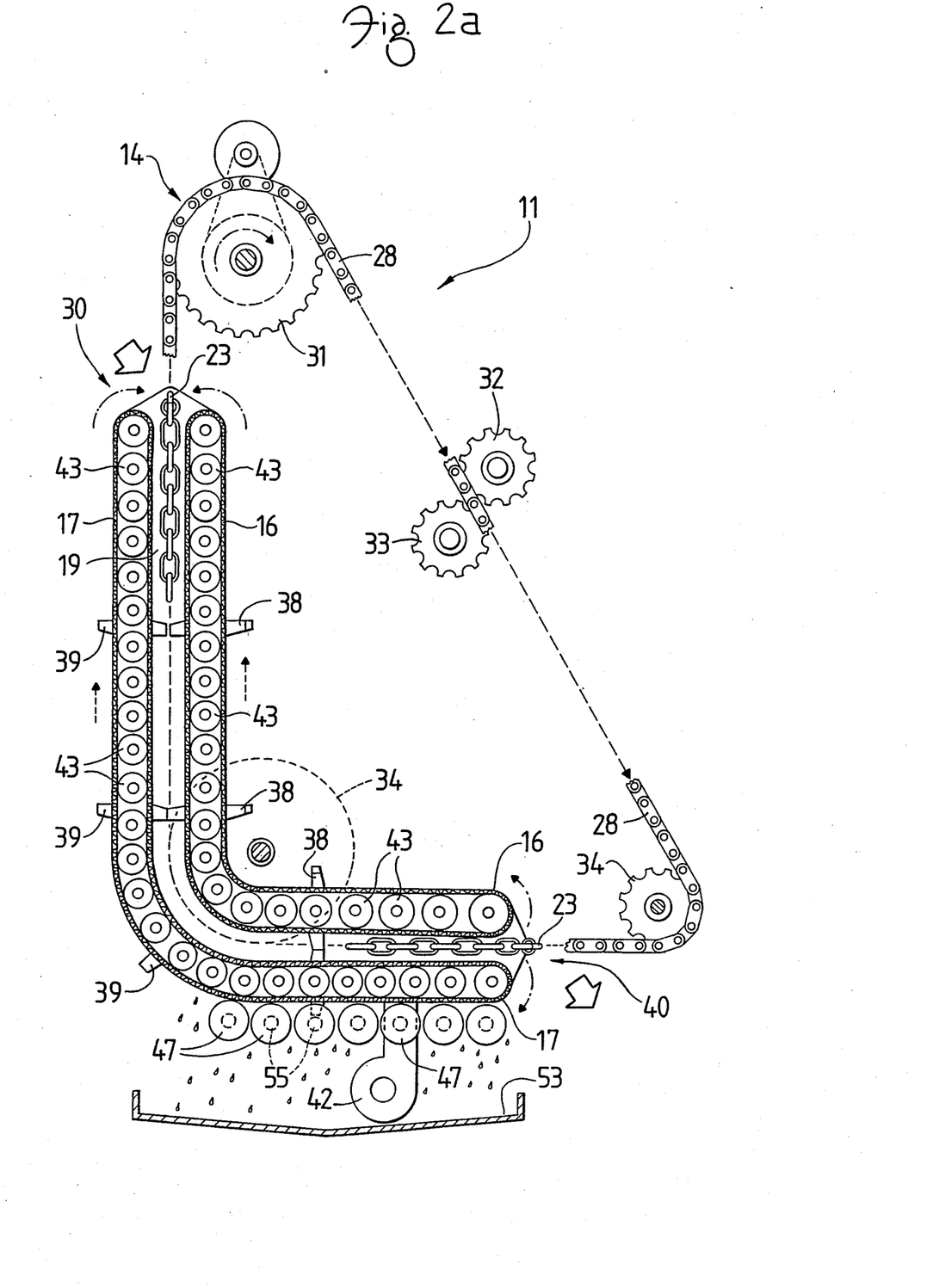
FIG. 2a is a sectional view taken along line 2a—2a of FIG. 2.
Figure 10:
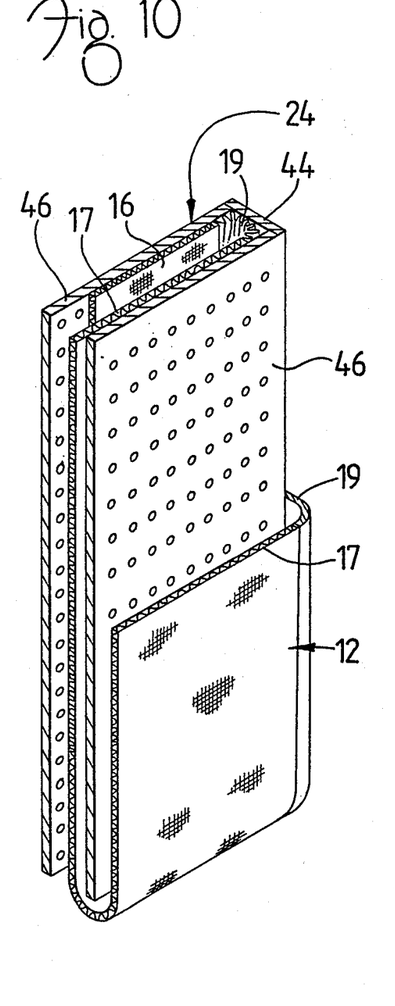
FIG. 10 is a partial sectional view of another embodiment utilizing an ultra high molecular weight plastic insert.
Figure 11:
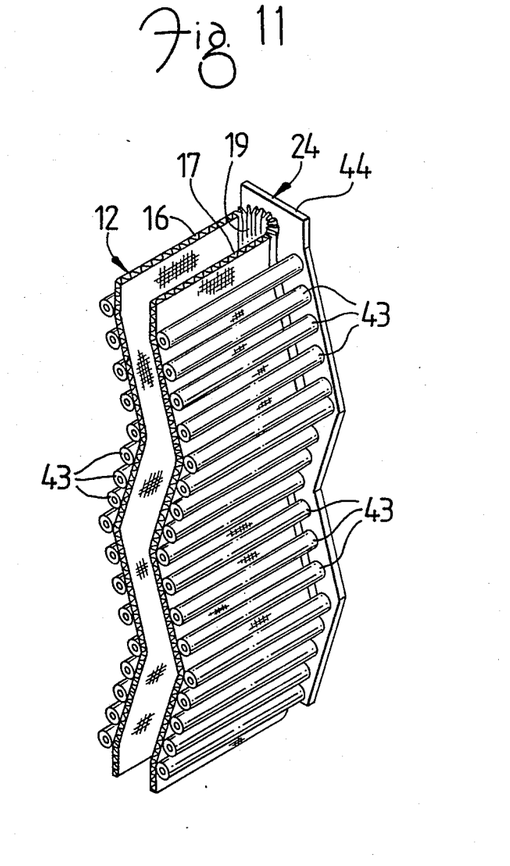
FIG. 11 is a partial sectional view of another embodiment utilizing an offset roller insert.

It will be understood from the foregoing that the rigid frame insert structure 24 must be pervious to permit the filtrate to pass through both walls of the inversion tube 12. In one embodiment, as shown in FIG. 2, the insert is made up of closely spaced generally parallel rollers 43 which are positioned and held in place by a frame 44. The frame 44 may be linear, parabolic, U-shaped, or offset as shown in FIG. 11. Alternatively the insert may comprise of a set of panels 46 of ultra high molecular weight plastic or other similar material with apertures therein as shown in FIG. 1 and 10. In either embodiment it will be appreciated that the structure is conducive to the movement of the tube 12 in, through, out and over the insert structure 24. In the embodiment utilizing the rollers 43 it can be seen that the rotation of the rollers promotes movement of the inversion tube 12 with contained sludge and of course, the ultra high molecular weight panels 46 have slick non-stick surfaces against which the tube 12 is free to slide or advance. With reference to the Figures, it will again be noted that the insert structure 24 is entirely enclosed within the tube 12 regardless of the type insert structure 24 or shape insert structure 24 utilized. In the embodiments other than the U-shaped configuration, inversion wheels 45 are mounted on the rigid insert structure 24 proximal the discharge opening 40 yet displaced laterally therefrom. These wheels facilitate tube inversion by engaging the walls of the tube along the flexible inversion strips 18 and 19. The wheels 45 are free to rotate in the direction of motion of the tube 12 at the point of engagement thus they assist in smoothing the 180° transition that the tube must undergo. These inversion wheels 45 may be used proximal both the inlet and outlet opening of the insert structure to help eliminate the possibility of the inversion tube wedging within the insert structure and hanging structure which would stop inversion. The inversion wheels 45, when used with the U configuration will permit movement of the inversion tube relative to the insert in conjunction with the inverted "J" guide track 26 of the support structure 13 even though it may not be accomplished freely. This condition may occur if the inversion tube "packs" with dry solids, that is, if the slurry dewaters too rapidly for the speed of tube inversion thus "packing" the tube and making inversion difficult even with the insert structure 24 in place. In the U-shaped embodiment of FIGS. 1 and 6 and the L-shaped embodiment of FIGS. 2 and 2a note that ground rollers 47 are positioned beneath the tube 12 to assist in supporting the weight of the tube 12 and contained sludge/slurry and to facilitate inversion or movement of the tube 12 but may be eliminated if desired. These rollers may be notched as at 55 to permit free passage of the sealing member 39.

Figure 14:
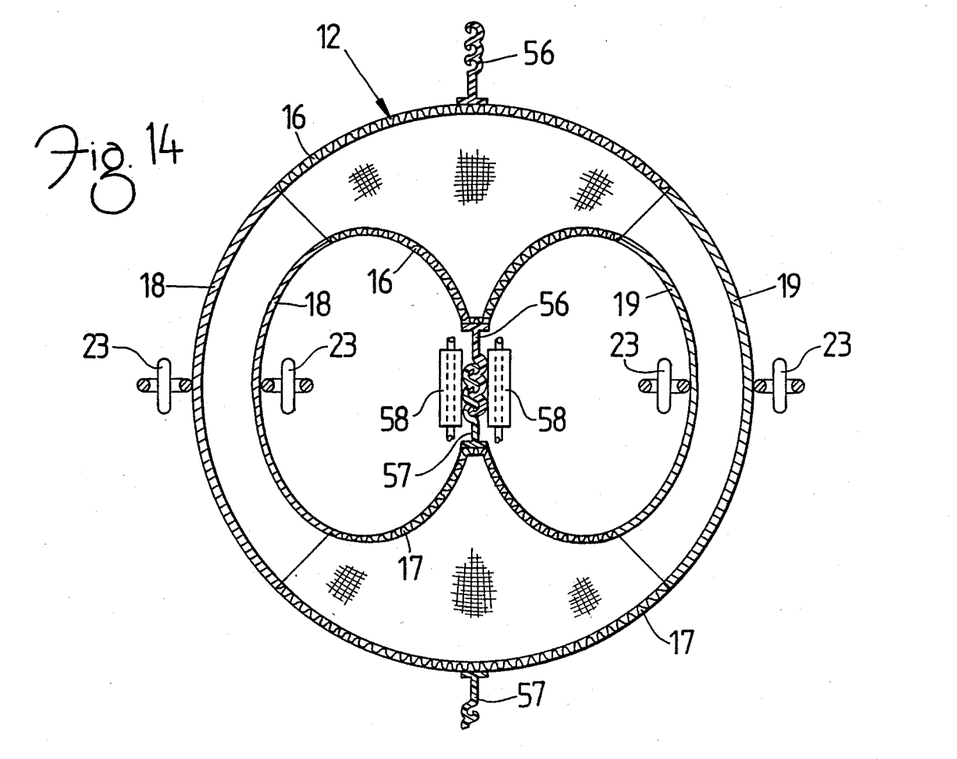
FIG. 14 is a sectional view of another embodiment wherein the rigid insert structure is eliminated.

In another embodiment depicted in FIG. 14, the porous frame insert structure 24 is omitted. In this embodiment a set of cooperatively positioned fastening elements 56 and 57 are attached to filter media segments 16 and 17 such that the fasteners 56 and 57 engage as the tube 12 enters the inlet opening 30 and disengage as the tube 12 leaves the outlet opening 40 and is inverted. In this manner the tube forms its own fixed, non-expandable volume restriction, thus permitting free movement of the inverted tube inside, outside and over itself without the inside surface of the tube 12 expanding outward into the outside surface of the tube 12, thus restricting free movement and hence inversion. The engagement of the fasteners on opposite surfaces of the inversion tube 12 at the inlet 30 will hold the opposing interior surfaces of the tube 12 in close proximity to each other thus forming a cross-sectional area somewhat like a "figure 8" and thus the volume defined by the attached inside surfaces along the closure is less than the volume of the outside surfaces, therefore free movement is permitted. The fastening elements 56 and 57 may be of any conventional type such as the elastomeric interlocking groove type depicted or conventional zipper type fasteners. In any event a set of mating guides 58 is readily provided at the inlet 30 and outlet 40 to insure proper closure. In this embodiment if fastener failure occurs, in the worst case, tube inversion may be difficult due to friction of the tube surfaces moving over themselves, however this can be designated as an alarm condition programmed into the drive unit 14 when the output torque thereof exceeds a certain amount.

Figure 6:
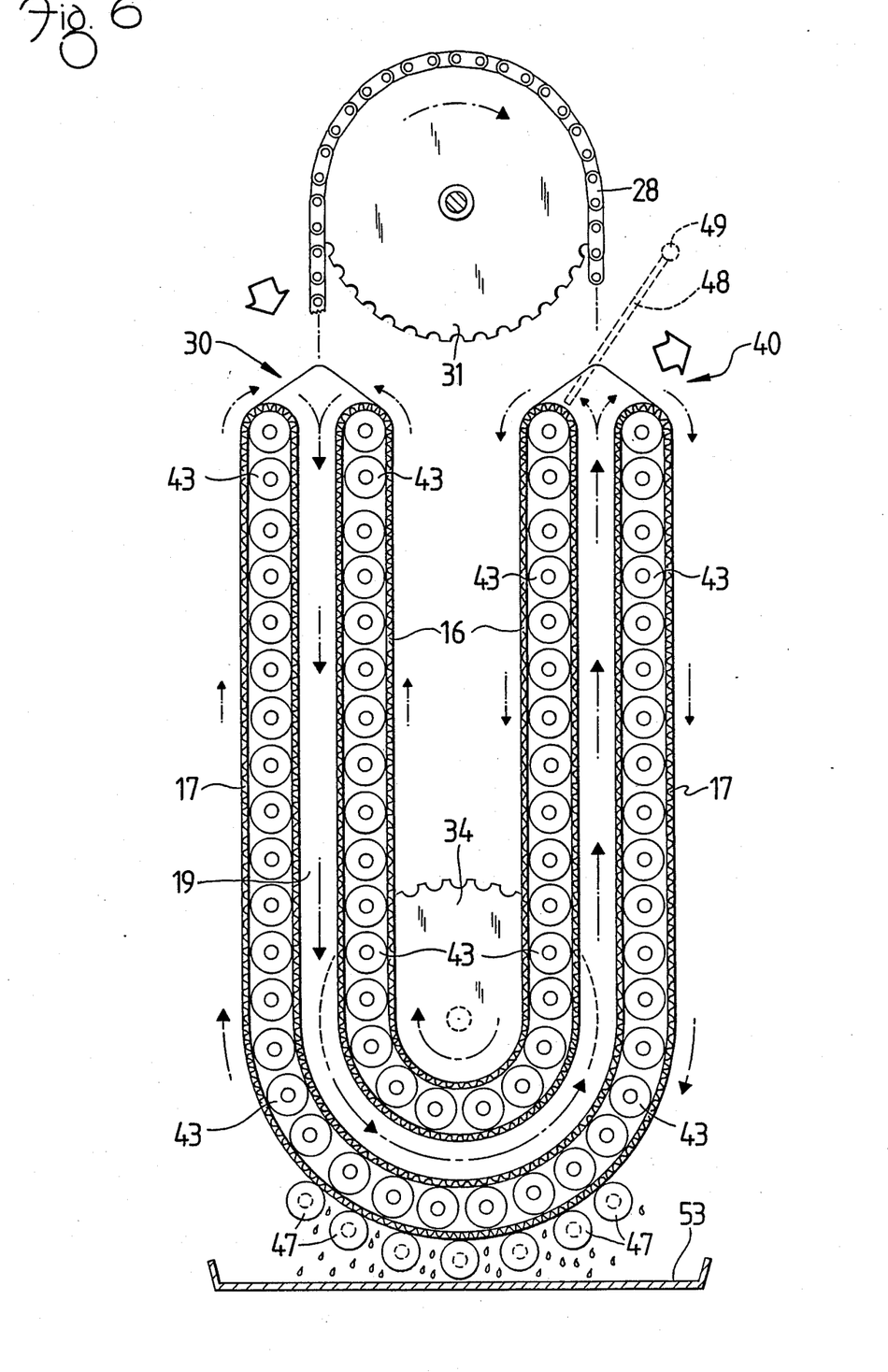
FIG. 6 is a partial sectional view of an embodiment similar to FIG. 1 utilizing rollers as the insert structure.

Also with respect to FIG. 6, note that a pivoting doctor blade 48 is mounted above the discharge outlet of the tube 12 to direct the sludge outwardly to one side of the press. The doctor blade 48 is pivoted at 49 and may incorporate an appropriate cam follower mechanism to provide for clearance of the flights 38 if utilized. Note that in the U-shaped embodiment it may be advantageous to use the filter media segment 16 only on the side of the tube which passes over the outside of the U-shaped frame. Likewise on the L-shaped embodiment, it may be advantageous to use the filter media segment 16 only on the lower portion of the tube 12. This would prevent filtrate from accumulating on the upper outer surface of the tube 12 and reducing the likelihood of a need for a vacuum pump.

Figure 3:
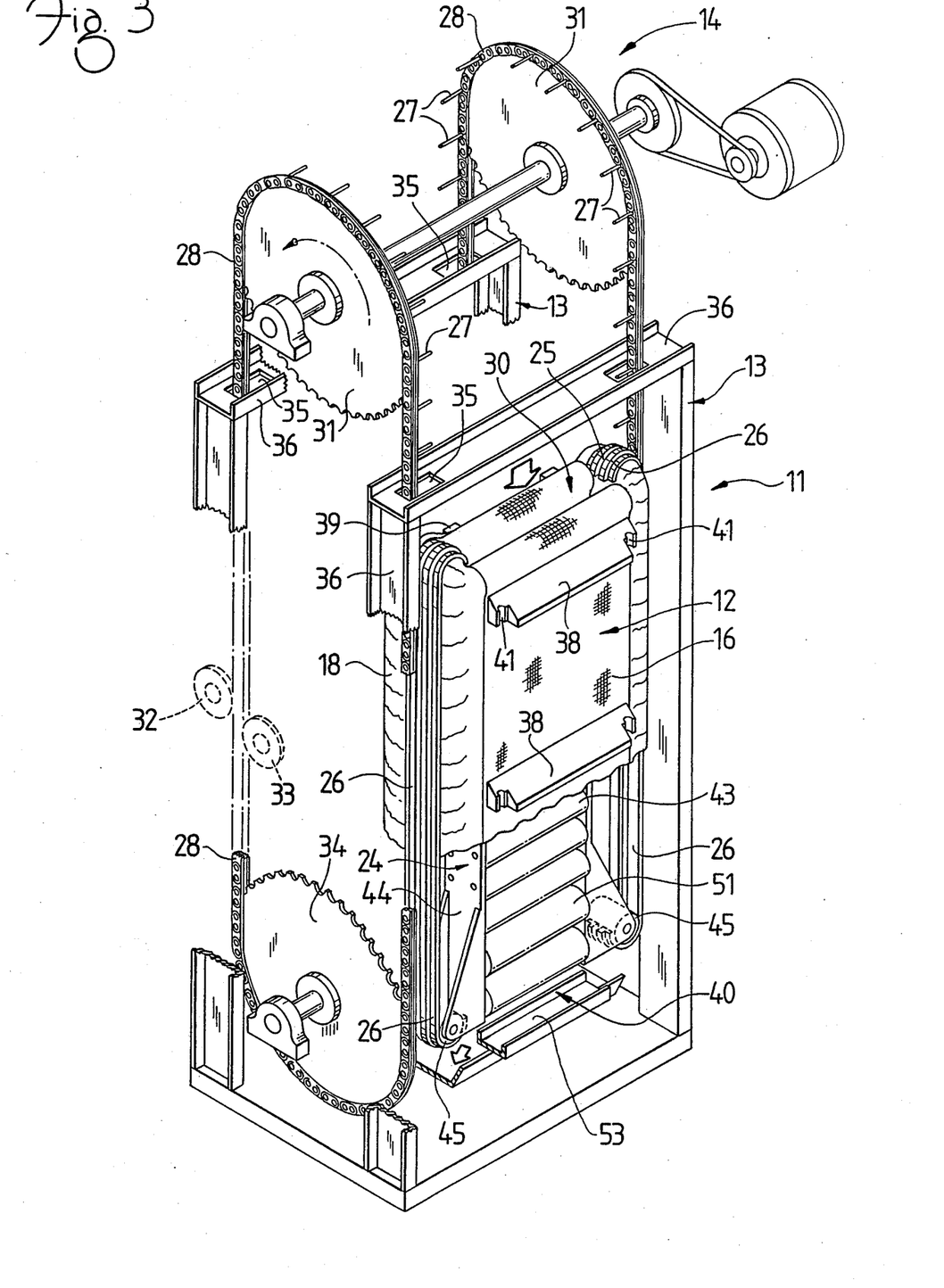
FIG. 3 is a perspective view of another embodiment of my invention.
Figure 4:
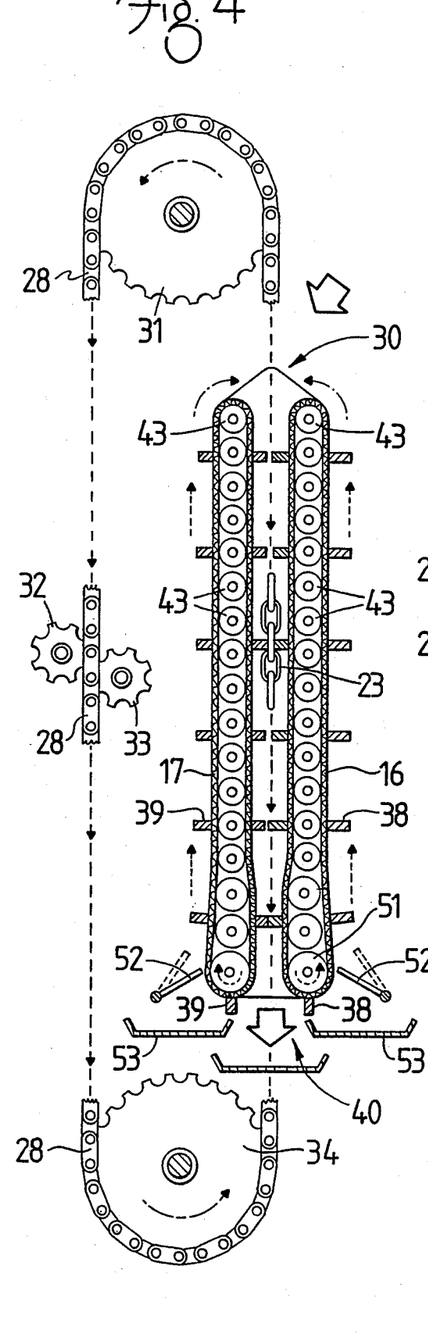
FIG. 4 is a partial sectional view of the embodiment shown in FIG. 3.
Figure 5:
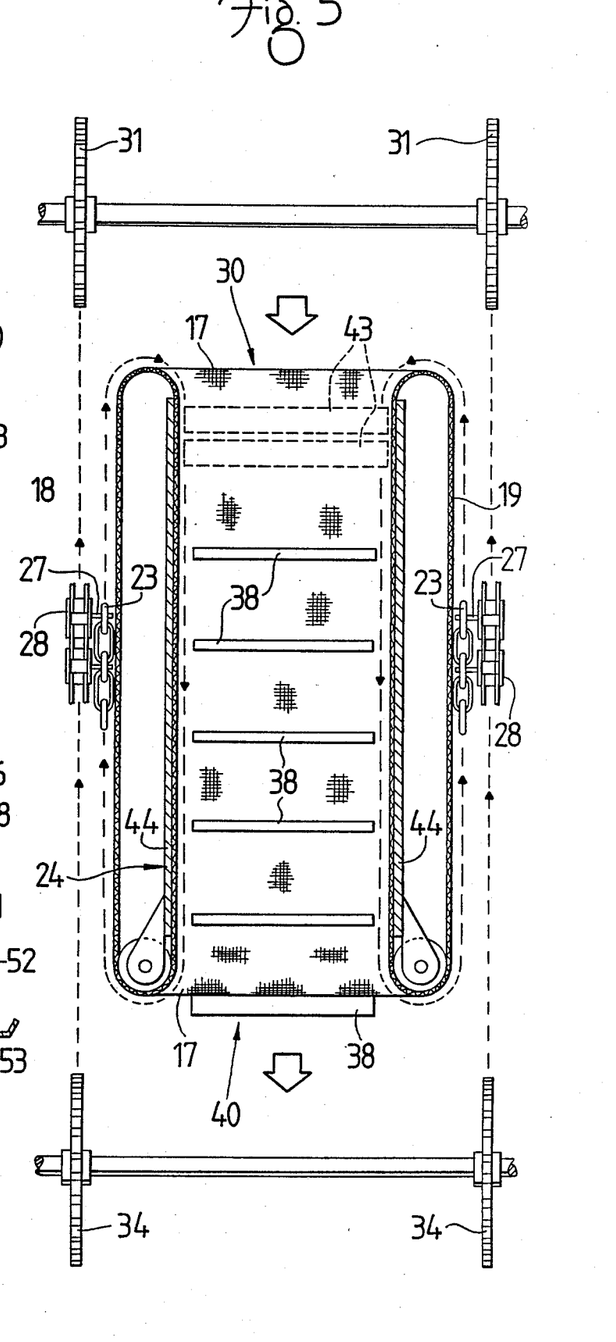
FIG. 5 is a partial sectional view of the embodiment shown in FIG. 3, taken at right angles to FIG. 4.

With reference to FIGS. 3, 4 and 5 note that the filtrate will move downward along the outside of the tube 12 to a certain extent. Thus near the bottom of the I-shaped configurations a set of deflector rollers 51 are provided to assist in deflecting the filtrate away from the discharge outlet of the tube 12 through which the dewatered sludge exits. With the "I" or vertical embodiment a filtrate deflector 52 may also be pivotally mounted near the outlet to direct the filtrate into a filtrate removal trough 53. A filtrate removal trough 53 is also provided beneath the L-shaped embodiment and the U-shaped embodiment.

With or without use of the insert structure 24, the inversion tube assembly will have considerable weight. This weight is supported by the link chains 23 through the chain attachments 21 and 22 to the flexible inversion material 18 and 19 of the tube 12 which in turn supports the contained slurry and the insert structure 24 if used. Support of the tube assembly is also directly through the link chains 23 which are supported between the two ends of the "J" guides 26 at the inlet 30 and outlet 40 of the inversion tube 12. When inversion occurs at the inlet opening 30, the link chains 23 fall or are pulled internally into the narrow inside volume of the tube 12 along with the attached fabric 16, 17, 18 and 19 of the tube 12. These link chains 23 will lie on and be spaced internally from the line of attachment of the filter media belt 16 and 17 and flexible inversion material 17 and 18 of the composite tube 12 and will therefore support directly the weight of the inversion tube 12 and the insert structure 24 with contained slurry through the top filter media belt on the "U" or "L" configuration. As noted heretofore, support of the inversion tube assembly may also be assisted by ground support rollers 47.

The movement of the outside walls of the tube 12 will tend to rotate the rollers of the rigid insert structure 24 if utilized in a direction which will assist in advancing or conveying the inside surfaces of the inversion tube 12. Thus, the insert structure 24 employing rollers 43 not only aids in separation of the two walls of the tube 12, but also assists in advancement of the tube 12 and thus inversion.

As previously noted sealing or conveying flights 38 and sealing members 39 may be attached to the outside surfaces of the inversion tube 12, extending laterally across the width of the filter media segments 16 and 17. The flights 38 have a height which is approximately the distance between the faces of the filter media inside the insert structure in the smaller cross-sectional area portion of the insert structure. The flights 38 help in conveyance of the slurry down into and solids out of the tube 12 for dewatered, thickened mass, or solid cake discharge. Referring to FIG. 4 it may be seen that these flights 38 will not cause with the closing or sealing of the inversion tube 12 prior to the small cross-sectional area which would prohibit the effect of the full hydrostatic head on the sludge prior to discharge. In the preferred "U" tube configuration the primary function of the flights 38 will be conveyance. In other configurations, the build-up of hydrostatic pressure head within the tube 12 by the slurry may cause a hose-like effect which would urge the slurry toward the discharge outlet 40 at a rate which would not permit sufficient dewatering or thickening. In these embodiments, as the tube 12 advances through the wedge shaped portion of the insert structure 24, the closure flights 38 along with the sealing members 39 will restrain flow of slurry in this area and will effectively seal the inversion tube periodically and intermittently during tube inversion. The flights 38 and sealing members 39 are spaced so that as they advance along with the tube 12, there will always be a sealing flight 38 and sealing member 39 in the small cross-sectional area of the tube for sealing purposes. The flights are notched at 41 to permit a snug fit around the link chain 23 as are the flight sealing members 39. Thus, the flights 38 and sealing members 39 cooperate to effect closure across the entire width of the tube 12 even around the link chains 23. The spacing of these flights 38 as noted above provide a positive detention time for the slurry thereby assuring that the sludge/slurry is retained within the inversion tube for a sufficient time to effect hydrostatic head dewatering. It is noted that this detention time may vary depending on the characteristics of the slurry.

Figure 13:
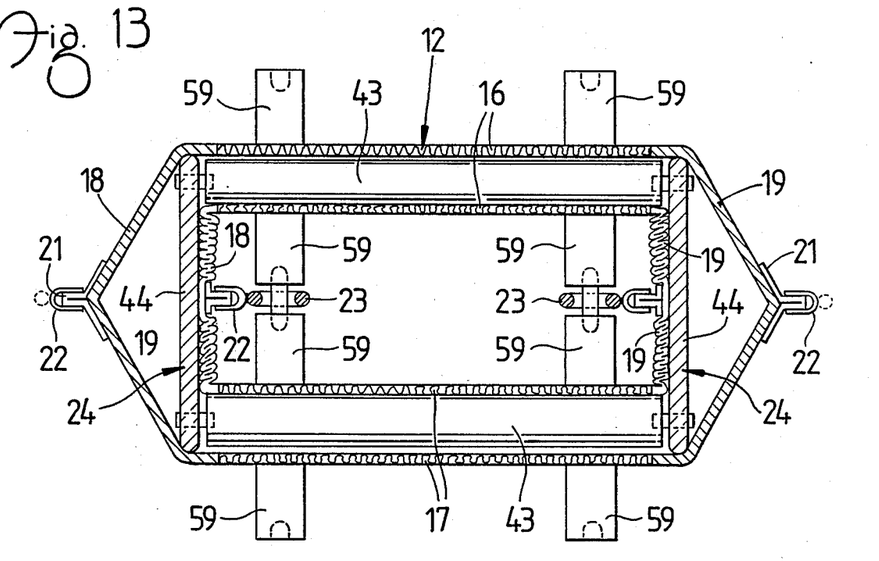
FIG. 13 is a sectional view along line 13—13 of FIG. 1 showing a variation of the internal structure wherein chain lock and drive blocks are used without flights.

In the U-shaped embodiment, the flights 38 may be eliminated however it may be desirable in some instances to nonetheless include chain lock blocks 59 as depicted in FIG. 13, which aid in driving and supporting or advancing the tube 12 internally of the insert structure 24.

Figure 12:
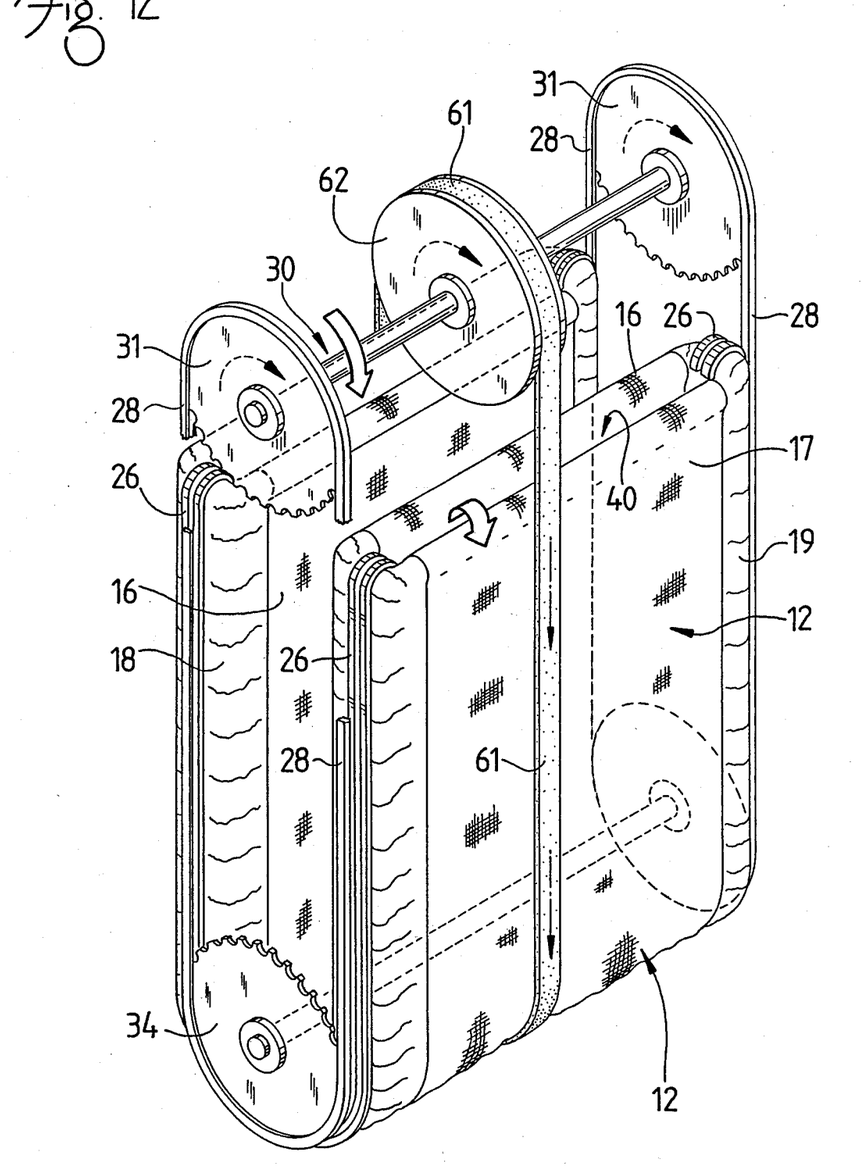
FIG. 12 is a partial perspective view of the embodiment of FIG. 1 with a supplemental support and drive band.

In operation the inside and outside surfaces of the tube 12 move or travel simultaneously. The roller chain carried pins 27 continuously engage and disengage from the links of the chain 23 to move or advance the tube 12. As the outside surface or wall of the inversion tube 12 advances, a corresponding portion of the inversion tube's composite material and chain 23 is pulled into the inside of the rigid insert structure 24 at the inlet opening 30 one end with a corresponding amount of inversion tube 12 and chain 23 pulled out of the rigid insert structure 24 at the outlet 40. The chain 23 is engaged by the "J" rail 26 and pins 27, thus the chain 23 and tube 12 are subsequently pulled along the outside of the insert structure 24 to return that portion of the inversion tube 12 to the inlet opening 30 for a cycle beginning. As the clean filter media belts 16 and 17 of the inversion tube 12 are pulled inside the insert structure 24 at the inlet opening 30, slurry is introduced to the inlet inversion tube press opening 30. The level of the slurry may be controlled by an appropriate inlet probe or level switch 54. Subsequently, as the inversion tube composite material 16, 17, 18 and 19 is pulled out of the tube outlet 40 and up or over the outside of the insert structure 24, dewatered or thickened solids product is ejected from the inversion tube press discharge opening 40. Liquid or filtrate goes through the filter media belts 16 and 17 portion of the inversion tube 12 and is collected outside the inversion tube press 11 while the solids are retained upon the inside surfaces of said filter media belts 16 and 17 or upon previously deposited solids thereon and to be discharged/ejected as the inversion tube 12 advances or is driven to the inversion tube press discharge outlet 40. Since the composite material inversion tube 12 has no lateral openings or edges of the filter media belts 16, 17 that require temporary and periodical mechanical or self sealing and unsealing for solids dewatering and cake discharge in a dewatering cycle and since the inversion tube 12 of this invention is a continuous non-interrupted tube or permanent laterally sealed volume with outlet closure, there are no possibilities that the sludge or slurry introduced into the inversion tube 12 will not be subjected to the full hydrostatic head which the inversion tube press can achieve and subjected to mechanical pressure and shear stresses developed as the inversion tube with contained slurry is pulled or advanced through the rigid insert 24. In as much as there are no mechanical seals to leak or otherwise malfunction, there is no other place for the solids in the slurry to go, consequently the solids introduced at the inlet 30 must exit at the outlet 40 with some small loss of solids through the filter media 16 and 17. However, the choice of filter media material will keep solid losses therethrough to a minimum. Also, there should be no limitation as to a minimum inlet slurry concentration so the inversion tube press can handle very dilute slurry solids concentration. To assist in generation of mechanical pressures and shear stresses upon the slurry, the rollers 43 of the rigid insert 24 may be spring loaded to open or close the width of the cross sectional area of the insert or the rollers 43 of the insert 24 may be offset relatively to each other to present an "S" or snake-like channel configuration within the rigid insert 24 which the inversion tube 12 with slurry must advance or be pulled through. The "S" configuration of the rollers 43, shown in FIG. 11, will impart a superimposed shear force on the slurry contained within the tube 12 aiding in further dewatering/thickening as the walls of the tube 12 are advanced around the offset rollers 43. As the tube 12 advanced, the inner walls undergo parallel lateral displacement. The alternate bending of the slurry or cake around the rollers 43 between the inner walls of the tube 12 causes cake or slurry deformation which creates new flow channels in the mass being dewatered. Further, the "S" shaped placement of the rollers may aid in creating an internal vacuum effect or an increase in shear stresses on the solids contained in the slurry between the walls due to the tendency of the wall to pull away from the solid and snap back to the confines of the insert structure. Referring to FIG. 12, it will be noted that in very wide application, the U-shaped embodiment may be additionally supported and driven by a wide belt 61 driven by and suspended from a sheave 62 intermediate the drive sprockets 31 and concomitantly rotatable therewith. The belt 61 extends around and below the tube 12 to provide external support and drive force thereto. This intermediate drive and support means utilizing a wide belt 61 and a sheave 62 may also be employed on other configurations.

While I have shown my invention in various forms, it will be obvious to those skilled in the art that it is not so limited but is susceptible of various changes and modifications without departing from the spirit thereof.

What I claim is:

1. A method of treating sludge-like material for separating solids and liquids therein comprising:
   (a) defining a restricted volume region using a frame structure;
   (b) forming a continuous tube having at least one longitudinal segment comprising a filter media, said tube having an inner and outer wall defining a cavity therebetween;
   (c) encapsulating said frame structure within said cavity such that said inner wall passes through said frame structure;
   (d) urging said continuous tube through said frame such that the portion of said tube forming said inner and outer wall are simultaneously exchanged;
   (e) introducing a slurry of solids and liquid suspension into the defined region at one end of said tube;
   (f) extracting liquids from said slurry through said filter media segment; and
   (g) discharging solids from said restricted volume region and said tube at a second end of said tube.

2. The process as defined in claim 1 further comprising urging said solids through said restricted volume region with flights attached to said tube and extending laterally therefrom.

3. A filtering and dewatering press for dewatering sludge and for solids separation processes comprising:
   (a) an inversion tube having at least one longitudinally extending filter media segment, said tube being joined to itself at each end thus forming an inner and outer wall;
   (b) a rigid elongated hollow insert structure encapsulated within said inversion tube between said inner and outer wall with said inner wall within said insert structure and said outer wall external of said insert structure; and
   (c) means for urging said inversion tube relative to said insert structure such that said inner wall moves out of said insert structure to become said outer wall simultaneously with movement of said outer wall into said insert structure to become said inner wall.

4. A press as defined in claim 3 wherein said inner and outer wall have a width at least equal to said filter media segment.

5. A press as defined in claim 4 wherein said insert structure is generally in the form of a rectangular tube having a length less than one half the length of said inversion tube, a width commensurate with the width of said filter media segment and a predetermined internal volume.

6. A press as defined in claim 5 wherein said insert structure includes roller wheels positioned proximal yet outwardly of an end of said insert structure and mounted for rotation about an axis, said roller wheels engaging said inversion tube as said wall transitions between the inside and outside of said insert structure.

7. A press as defined in claim 5 wherein said insert structure comprises a plurality of generally parallel rollers extending across said inner wall and frame means for holding said rollers in relative position to one another, said rollers contacting the inner wall of said inversion tube.

8. A press as defined in claim 7 wherein said rollers are offset such that the interior of said insert structure is non-linear.

9. A press as defined in claim 5 wherein said insert structure comprises at least one panel of ultra high molecular weight plastic adapted for removal of filtrate passing through said filter media segment supported in a frame adjacent said filter media segment of said inner wall.

10. A press as defined in claim 3 wherein said means for urging comprises:
    (a) a first drive element defining a continuous loop;
    (b) means for driving said first drive element about said continuous loop;
    (c) a second drive element affixed to said inversion tube along the length thereof and constrained to move therewith along a path which has a segment thereof contiguous and parallel to said continuous loop; and
    (d) means for joining said first and second drive elements along said contiguous segment such that said second drive element moves concomitantly with said first drive element.

11. A press as defined in claim 10 wherein said first drive element comprises a roller chain mounted about a drive sprocket and an alignment sprocket; said second drive element comprises a link chain affixed to said inversion tube, and said means for joining comprises a plurality of pins extending from said roller chain for engagement within alternate links of said link chain.

12. A press as defined in claim 11 wherein said link chain is partially supported along said contiguous portion by a set of spaced apart guide rails which align said alternate links for engagement by said plurality of pins.

13. A press as defined in claim 12 wherein said guide rails include a J shaped section at each end which curves from the outer wall to the inner wall to facilitate inversion of said tube and to provide primary support to said tube.

14. A press as defined in claim 11 wherein said inversion tube comprises at least one longitudinally extending segment of flexible inversion material and at least one longitudinally extending segment of filter media and wherein said tube has a plurality of outwardly extending members permanently attached thereto for attachment to selected links of said link chain.

15. A press as defined in claim 10 wherein said contiguous segment is generally L-shaped.

16. A press as defined in claim 10 wherein said contiguous segment is U-shaped.

17. A press as defined in claim 16 further comprises:
    (a) a sheave mounted parallel to and spaced from said drive sprocket for concomitant rotation therewith; and
    (b) a belt-like member supported by and driven by said sheave and extending downwardly about the extension of said inversion tube providing support thereto.

18. A press as defined in claim 10 wherein said contiguous segment is generally I shaped.

19. A press as defined in claim 3 wherein said rigid insert structure has a section of decreasing internal cross-section terminating a section of constant internal cross-sectional area.

20. Apparatus as defined in claim 19 further comprising a plurality of sealing flights affixed to said tube transversely of said filter media section and extending normally to the inner and outer wall, said sealing flight extending for cooperative engagement with said inversion tube within said section of constant cross-sectional area.

21. A press as defined in claim 20 wherein said sealing flights are notched to cooperatively engage said link chain within said insert.

22. A press as defined in claim 3 wherein said inversion tube comprises at least one elongated strip of filter media material and at least one elongated strip of flexible non-porous inversion material said strips being joined along their longitudinal margin to form an elongated tube, said tube being inverted over itself and joined at its free ends with said strip of flexible material connected to itself and said strip of filter media connected to itself such that a tube having an outer wall and spaced apart inner walls are formed, said walls being continuously joined and interchangeable responsive to said means for urging.

23. A filtering and dewatering press for dewatering sludge and for solids separation processes comprising:
(a) an inversion tube having at least one longitudinally extending filter media segment, said tube being joined to itself at each end thus forming an inner and outer wall;
(b) means for restricting the expansion of said inner wall relative to said outer wall; and
(c) means for urging said inversion tube longitudinally relative to said restricting means such that a portion of said inner wall undergoes inversion and becomes a portion of said outer wall simultaneously with a portion of said outer wall undergoing inversion to become a portion of said inner wall.

24. A press as defined in claim 23 wherein said means for restricting comprises a set of cooperatively positioned fastening elements carried by said tube longitudinally therealong in confronting and engaging relationship along said inner wall and in opposing and separated relationship along said outer wall such that said inner wall is held in close spaced relation adjacent said fastening elements.

25. A press as defined in claim 23 wherein said means for restricting is a rigid elongated hollow insert structure encapsulated tube between said inner and outer wall with said inner wall within said insert structure and said outer wall external of said insert structure.

26. A press as defined in claim 23 wherein said filter media segment extends over the length of said inner and outer walls such that filtrate removed from a contained slurry and moving outward passes through said inner wall in a first relative direction such that solids are deposited thereon and passes through said outer wall in the opposite relative direction whereby solids previously deposited on said outer wall are subjected to a flow of filtrate having a tendency to dislodge said solids.

* * * * *